US009130926B2

(12) United States Patent
Nori et al.

(10) Patent No.: US 9,130,926 B2
(45) Date of Patent: Sep. 8, 2015

(54) AUTHORIZATION MESSAGING WITH INTEGRAL DELEGATION DATA

(71) Applicant: Microsoft Corporation, Redmond, WA (US)

(72) Inventors: Vijayavani Nori, Sammamish, WA (US); Hervey O. Wilson, Redmond, WA (US); Caleb G. Baker, Seattle, WA (US); Gregory C. Johnson, Redmond, WA (US); Murli Dharan Satagopan, Kirkland, WA (US); Igor Sakhnov, Sammamish, WA (US); Samantha Kwok, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 13/727,690

(22) Filed: Dec. 27, 2012

(65) Prior Publication Data

US 2014/0189797 A1 Jul. 3, 2014

(51) Int. Cl.
*H04L 29/06* (2006.01)

(52) U.S. Cl.
CPC ........ *H04L 63/0807* (2013.01); *H04L 63/0815* (2013.01); *H04L 63/0884* (2013.01)

(58) Field of Classification Search
CPC ..... H04L 63/20; H04L 63/10; H04L 63/0807; H04L 63/0815; G06F 15/16; G06F 15/173
USPC ............ 726/1, 2, 6, 9, 20, 27, 29, 4; 709/203, 709/204, 223
See application file for complete search history.

(56) References Cited

U.S. PATENT DOCUMENTS

| | | | | |
|---|---|---|---|---|
| 6,505,244 B1* | 1/2003 | Natarajan et al. | ............. | 709/223 |
| 6,678,835 B1* | 1/2004 | Shah et al. | ................... | 714/4.12 |
| 7,526,541 B2* | 4/2009 | Roese et al. | .................. | 709/223 |
| 7,551,627 B2* | 6/2009 | Scholl | ........................... | 370/400 |
| 8,010,085 B2* | 8/2011 | Apte et al. | .................... | 455/410 |
| 2005/0267954 A1* | 12/2005 | Lewis et al. | ................... | 709/221 |
| 2007/0157203 A1* | 7/2007 | Lim | .............................. | 718/100 |

(Continued)

OTHER PUBLICATIONS

Stackoverflow.com,"Why Does OAuth v2 Have Both Access abd Refresh Token?", Aug. 26, 2011.*

(Continued)

*Primary Examiner* — Kambiz Zand
*Assistant Examiner* — Tongoc Tran
(74) *Attorney, Agent, or Firm* — Aneesh Mehta; Kate Drakos; Micky Minhas (57) ABSTRACT

A computer-implemented method for authorizing access by a client application to a resource of a user maintained on a first server computing system, the client application being implemented on a second server computing system, includes receiving a delegation message from the first server computer system to initiate authorization of the access by the client application, issuing an authorization message to the first server computer system, the authorization message comprising an authorization data package for redemption by the client application, the authorization data package comprising first through fourth integral delegation data indicative of the user, the client application, the resource, and a timestamp, respectively, receiving a redemption message from the second server computing system comprising the authorization data package, conducting an analysis of the authorization data package, and sending an access token to the second server computing system based on the analysis.

20 Claims, 4 Drawing Sheets

(56) References Cited

U.S. PATENT DOCUMENTS

| | | | |
|---|---|---|---|
| 2010/0077467 A1 | 3/2010 | Satagopan et al. | |
| 2011/0126197 A1* | 5/2011 | Larsen et al. | 718/1 |
| 2011/0289134 A1* | 11/2011 | de los Reyes et al. | 709/203 |
| 2011/0302623 A1* | 12/2011 | Ricci | 726/1 |
| 2012/0047284 A1* | 2/2012 | Tarkoma | 709/247 |
| 2012/0084184 A1* | 4/2012 | Raleigh et al. | 705/30 |
| 2012/0144501 A1 | 6/2012 | Vangpat et al. | |
| 2012/0185837 A1* | 7/2012 | Beatty et al. | 717/162 |
| 2012/0204221 A1 | 8/2012 | Monjas Llorente et al. | |
| 2012/0254957 A1* | 10/2012 | Fork et al. | 726/6 |
| 2013/0031359 A1* | 1/2013 | Laidlaw et al. | 713/155 |
| 2014/0032759 A1* | 1/2014 | Barton et al. | 709/225 |

OTHER PUBLICATIONS

"OAuth2", Retrieved at <<https://github.com/SpringSource/spring-security-oauth/wiki/oAuth2>>, Retrieved Date : Nov. 22, 2012, pp. 8.

"OAuth", Retrieved at <<http://support.google.com/a/bin/answer.py?hl=en&answer=162106>>, Retrieved Date : Nov. 22, 2012, pp. 3.

Alamy, et al., "xDAuth: A Scalable and Lightweight Framework for Cross Domain Access Control and Delegation", Retrieved at <<http://profsandhu.com/zhang/pub/sacmat11-xdauth.pdf>>, Proceedings of the 16th ACM symposium on Access control models and technologies, Jun. 15, 2011, pp. 10.

"Code Sample: OAuth 20 Delegation", Retrieved at <<http://msdn.microsoft.com/en-us/library/windowsazure/gg185937.aspx>>, Apr. 7, 2011, pp. 7.

Dooley, et al., "Your Data, Your Way", Retrieved at <<http://www.cse.buffalo.edu/faculty/tkosar/DataCloud2012/papers/datacloud2012_paper_3.pdf>>, Workshop on data intensive computing in the clouds, Nov. 11, 2012, pp. 7.

Goland, "Stuff Yaron Finds Interesting," Retrieved at <<http://www.goland.org/oauthgenericdelegation/>>, Jun. 21, 2010, 6 pages.

Wikipedia, "Kerberos (protocol)", Retrieved at <<en.wikipedia.org/wiki/Kerberos_(protocol)>>, Nov. 28, 2012, 4 pages.

Wikipedia, "HTTP cookie", Retrieved at <<en.wikipedia.org/wiki/HTTP_cookie>>, Dec. 20, 2012, 12 pages.

"Overview of OAuth WRAP," Retrieved at <<http://msdn.microsoft.com/en-us/library/ff750546.aspx>>, Nov. 30, 2012, 2 pages.

* cited by examiner

AUTHORIZATION MESSAGING WITH INTEGRAL DELEGATION DATA

BACKGROUND OF THE DISCLOSURE

Brief Description of Related Technology

Software applications are often designed to perform specific tasks, such as word processor applications for drafting documents, or email programs for sending, receiving and organizing email. In many cases, software applications are designed to interact with other software applications or other computer systems. For example, a client computer system may connect to a server computer system in a data center to access application information. The server computer system may be configured to ask the client computer system for some type of authentication to verify that the client computer system is authorized to access the requested application information. For instance, if a client computer system wants to access email information on an email server, the email server may ask the client computer system to supply credentials, e.g., a username and a password, to verify the user's identity.

OAuth is a standard for authorizing third-party access to server resources without forcing an end user to share credentials with the third party. In a typical OAuth scenario, a client application is authorized to access resources of an end user maintained on a server computer system. The client application may redeem a token to access the server resources. The resources may then be used by the client application, despite the client application not knowing the username and password of the end user. For example, a financial reporting application (the client application) redeems a token to access the financial records of an end user available via a number of services (the server resources). The responsibility for issuing tokens and otherwise managing the authorization process is often delegated to a third-party access control service.

SUMMARY OF THE DISCLOSURE

Methods, systems, and computer program products are directed to authorizing access by a client application on one server computer system to a resource of a user maintained on another server computing system. Messaging to, from, and/or between the server computer systems includes integral delegation data involved in the process of authorizing the access.

In accordance with one aspect of the disclosure, an authorization message includes an authorization data package for redemption by a client application. The authorization data package, in turn, includes integral delegation data. An access token is provided or sent based on an analysis of the authorization data package.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWING FIGURES

For a more complete understanding of the disclosure, reference should be made to the following detailed description and accompanying drawing figures, in which like reference numerals identify like elements in the figures.

While the disclosed systems and methods are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION

Methods, systems, and computer program products are described for authorization messaging and other authorization services. As described below, the authorization messaging is equipped with built-in, constituent, or otherwise integral delegation data. Authorization codes, refresh tokens, and other authorization messaging may thus be made self-contained. The disclosed embodiments may be useful in connection with the issuance and redemption of authorization delegations, such as OAuth2 delegations.

The disclosed embodiments may enable and facilitate authorization delegations in geographically or otherwise distributed systems or architectures, in which, for example, an authorization server and a protected resource are separate entities. As described below, the integral delegation data in the authorization messaging may enable concurrent access, e.g., between different instances of an authorization server. The integral delegation data may additionally or alternatively address synchronization delays between instances of an authorization server. As a result, synchronization delays do not hamper the creation or redemption of delegations.

The disclosed embodiments may alternatively or additionally address scale issues presented by an authorization server architecture. The integral delegation data in the authorization messaging may support administrator consented applications. Such administrator consent may be useful in large enterprises. Instead of thousands of per-user delegation entries, a single delegation entry associated with the administrator may establish consent for a particular client application. Such administrator consent may apply to all users for a given tenant or other entity, which may be identified in the integral delegation data. The single delegation entry may be associated with any group of users, e.g., all of the users within a security realm or group, or some other subset of users. The administrator consent notwithstanding, the authorization codes, refresh tokens, or other authorization messaging may include or specify data identifying the respective user. In fact, user account status may be verified when registering and/or redeeming delegations, thereby providing additional security.

The term "delegation data" is used in the sense that the data may correspond with the data typically stored or otherwise managed or processed by a service to which authorization and/or access control services are delegated. For example, the delegation data may correspond with the data stored in a delegation database, table, or other data store.

Notwithstanding any references herein to various commercially available services or software products, the disclosed embodiments are not limited to any particular provider of access control or authorization services or software products.

For example, the disclosed embodiments may be useful in and/or with a variety of different authorization service providers.

Figure 1:
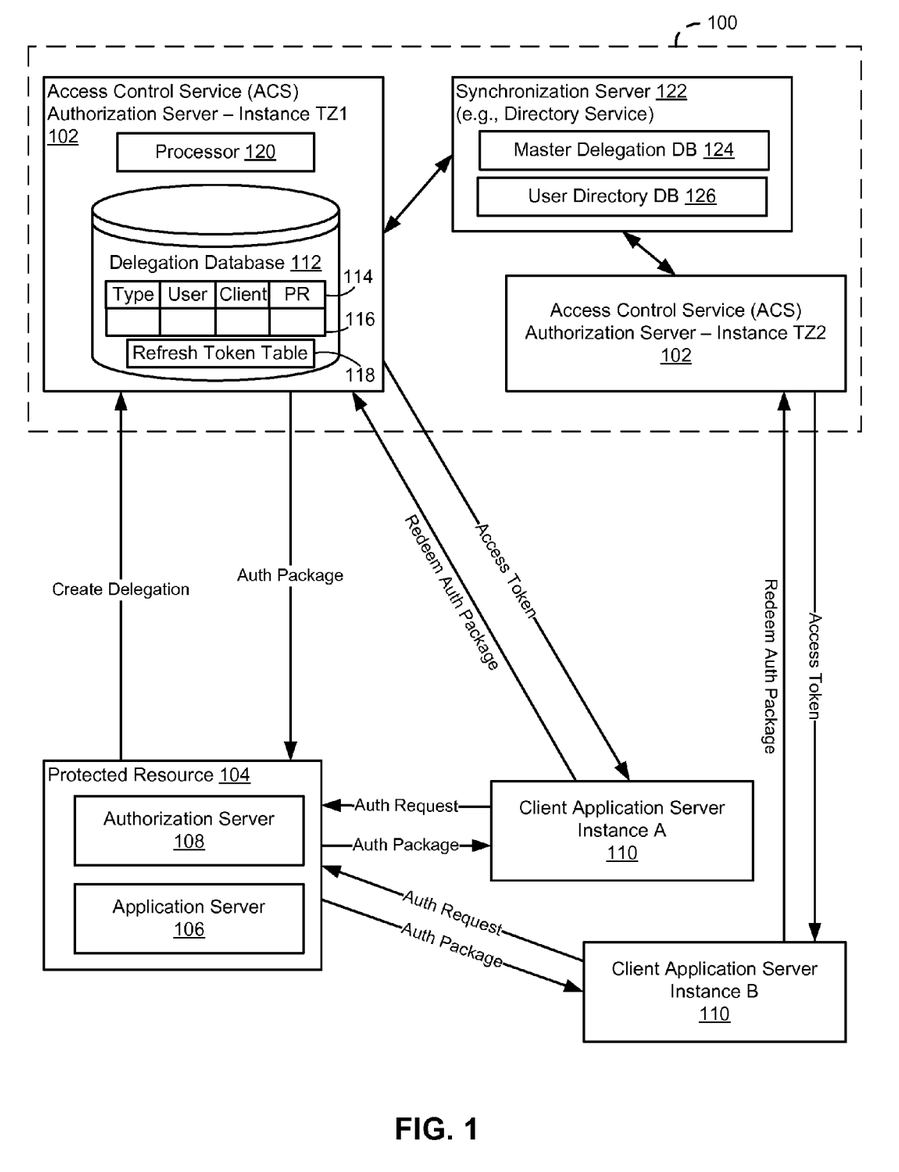
FIG. 1 is a block diagram of an exemplary system configured for authorization messaging in a distributed authorization service architecture in accordance with one embodiment.

FIG. 1 depicts an environment in which a system 100 is configured to authorize access by a client application in a distributed authorization service architecture. The system 100 includes a number of authorization servers 102 configured to provide authorization messaging and other authorization services. As described below, the authorization servers 102 are in networked communication with one another to provide the access control services. In this example, two instances of the authorization servers 102 are depicted. The instances may be geographically distributed. In this example, one of the authorization servers 102 is located in time zone (TZ) 1, while the other authorization server 102 is located in time zone (TZ) 2. Each authorization server 102 may include one or more server computers or computing systems. For example, each authorization server 102 may be implemented in a data center. The system 100 may include any number of authorization servers 102 distributed in various geographic or other arrangements. The authorization servers 102 may be configured to provide the access control services as part of a cloud-based architecture, such as the architecture provided via the MICROSOFT® WINDOWS AZURE™ cloud platform. Thus, in some examples, the authorization services may be provided via the MICROSOFT® WINDOWS AZURE™ AD Access Control Service (or ACS).

The authorization servers 102 and other components of the system 100 are configured to enable an owner of a protected resource 104 to provide consent to the client application to access the protected resource 104. The protected resource 104 may maintain data hosted by a service implemented by one or more server computers. In this example, the protected resource 104 includes an application server 106 and an authorization server 108 for controlling access to the services provided by the application server 106. The data or other resources may be maintained by or on the application server 106 or other server (e.g., a database management server) of the protected resource 104.

The protected resource data may be any type of data. For example, the protected resource data may include an individual's bank account records, photographs, or email account. The individual may access such data via a website supported by the application server 106 after a login or process in which user credentials are provided to the authorization server 108. The configuration of the protected resource 104 may vary from the example shown. For example, the services of the application server 106 and the authorization server 108 may be provided by a common server computer or otherwise integrated to any desired extent.

The authorization servers 102 and other components of the system 100 are delegated the responsibility for managing access to the protected resource 104 by the client application. The owner of the protected resource 104 may also be a user of the client application wishing to access the protected resource 104. The client application is implemented on one or more client application servers 110. In this example, the client application is implemented on two instances of the client application servers 110, an Instance A and an Instance B. Each instance of the client application server 110 may include one or more server computers configured to implement the client application for a particular geographic area, for a particular type of device (e.g., personal computer, mobile phone, or other mobile device), and/or for other user scenarios. In one example, instance A of the client application server 110 is geographically near the instance of the authorization server 102 located in time zone 1. Instance B of the client application server 110 may then be geographically near the instance of the authorization server 102 located in time zone 2. Communications between the authorization servers 102 and the client application servers 110 may thus be arranged in accordance with the geographic distribution of the various servers. However, the arrangement and configuration of the client application servers 110 may vary.

The authorization process may enable scenarios in which the user/resource owner provides consent to the client application to access the user's data maintained by the protected resource 104. Such consent may be provided in several ways, including, for instance, prior consent, runtime consent for a present request, and runtime consent for present and future requests. In prior consent cases, the client application may make use of an existing recorded consent and request access to the protected resource 104. In runtime consent for present requests, the client application may receive a one-time access token to access the protected resource data. In runtime consent for present and future requests, the client application may receive a long-lived refresh token or a short-lived authorization code, which may be redeemed for a long-lived refresh token. Access to the protected resource data is thus enabled.

Control of the authorization process is delegated to the system 100. The authorization servers 102 provide the authorization services for the various types of consent scenarios.

The control of the authorization process includes or involves messaging between the server computers or other components of the authorization servers 102, the protected resource 104, and the client application servers 110. The messaging may support the above-referenced and other consent scenarios.

The messaging may be implemented in accordance with the OAuth or OAuth2 protocols or other standards. For example, in OAuth2 delegation scenarios, the protected resource 104 requests one of the authorization servers 102 to register a delegation. Delegation may be registered as a relationship between the client application and the protected resource 104, after obtaining the user's consent. The client application (e.g., the client application server 110) may then be handed an authorization code or refresh token that the client application can redeem at one of the authorization servers 102 for an access token that allows the client application to access the user's data at the protected resource 104. Notwithstanding the foregoing, the disclosed embodiments may be useful in systems, architectures, or environments configured in accordance with other protocols or standards.

In typical OAuth implementations, the authorization codes and refresh tokens are unique handles that are stored at the authorization server 102. When an access token is to be issued, the handles are used to look up a delegation entry in a delegation database 112 or other data store of the authorization server 102. This typical approach may be problematic due to the separated nature of the protected resource 104 and the authorization server 102. Problems may arise upon concurrent requests for delegation authorization codes or refresh tokens from the various servers of the client application, and/or concurrent requests to redeem the authorization codes at different instances of the authorization server 102. Such requests may result in the creation of multiple delegation relationship entries in the delegation database 112, which may be onerous for management. New requests may overwrite the handles in the previously existing delegation entries, thereby resulting in runtime failures when the client application attempts to redeem a stale authorization code/refresh token handle.

The geographic distribution of the authorization servers 102 may give rise to further challenges. Delegation entries registered at one instance of the authorization server 102 may not be immediately redeemable at another instance. As described below, the delegation entries are synchronized across the instances of the authorization server 102. A time lag to complete the synchronization from the original instance to the others may result in access denials.

The delegation database 112 may be a local store of authorization data for each authorization server 102 of the system 100. Each delegation database 112 may include one or more tables (or other groups) of delegation data. In this example, the delegation database 112 includes a table 114 for authorization code registrations. Each entry or record 116 in the table 114 may be directed to storing the delegation data for a respective user. As described below, the table 114 is configured to support records for both administrators and end users to facilitate group (or collective) and per-user authorizations, respectively. In this example, the delegation database 112 also includes a table 118 directed to storing delegation data for refresh token registrations. The delegation data for refresh token registrations may be the same as, or different than, the data for other registrations. The configuration of the delegation database 112 may vary. For example, the delegation data for authorization code and refresh token registrations may be integrated in a single table to any desired extent. Further details regarding the fields or contents of the tables 114, 118 are set forth below.

Each authorization server 102 may include a processor 120 to implement one or more authorization and/or access control services. As described below, the processor 120 may be in communication with one or more memories to access instructions or instruction sets configured for implementation of such services. For example, the processor 120 may be configured via database management instructions to manage the entry and other processing of registration data in the delegation database 112.

The processor 120 may be configured to receive or exchange delegation data for the delegation database 112 via various authorization messaging. In this example, the system 100 includes a synchronization server 122 configured to distribute delegation data between the instances of the authorization servers 102. The synchronization server 122 may include a master delegation database 124 in which delegation data for the system 100 is maintained. The processor 120 of each authorization server 102 may accordingly be configured to synchronize the local delegation database 112 with the system-wide delegation data in the master delegation database 124. The synchronization server 122 may alternatively or additionally include a user directory database 126. The synchronization server 122 may accordingly be configured to provide online directory services for the system 100. Such services may be useful in user account verification procedures, as described below. Alternatively or additionally, the synchronization server 122 is configured to support communications with a separate identity provider (not shown), such as an enterprise or other server (e.g., MICROSOFT WINDOWS LIVE ID® service, OpenID, etc.), from which user account status information may be obtained.

The above-described components of the system 100 are operative to authorize access to the protected resource data by the client application in accordance with the following messaging scheme. At the outset, one of the client application servers 110 sends an authorization request ("Auth Request") to the protected resource 104. Once the user provides credentials to the protected resource 104, the protected resource 104 may send a delegation message to the authorization server 102 with instructions to create a delegation entry ("Create Delegation") or otherwise register an authorization delegation for the user. Upon receipt of, and in response to, the delegation message, the authorization server 102 issues an authorization message ("Auth Package") to the protected resource 104.

The authorization message may include a number of data items. In some embodiments, the authorization message includes or specifies a client ID, a client secret, and/or other information specific to the client application or client application server 110. In other embodiments, the client application is already in possession of the client ID and the client secret. In typical OAuth scenarios, an authorization code and/or refresh token is sent to be redeemed by the client application server 110. Rather than send a unique handle representative of the authorization code or the refresh token, the authorization server 102 incorporates an authorization data package into the authorization message. Instead of the unique handle (which would need to be used to look up one of the delegation entries 116 in the delegation database 112), the authorization data package includes or specifies some or all of the delegation data that may otherwise be stored in the delegation database 112. The authorization data package may specify information sufficient to otherwise identify and define the delegation entry at runtime. For example, the user, the protected resource 104 (or server thereof), and the client application (or server 110 thereof) may be specified. Further information, such as a timestamp, may also be specified as described below. The delegation data may thus be a built-in, constituent, or otherwise integral part of the authorization message. With the integral delegation data, the delegation database 112 need not store or issue a unique handle for the delegation registration.

The authorization data package and the integral delegation data thereof may take the place of, or serve as, the authorization codes and refresh tokens in the remainder of the authorization process. The authorization codes and refresh tokens may thus be made self-contained. The authorization data package may be configured as a binary large object (blob) or other data package. Within the blob or other container or package, the integral delegation data may be arranged in a parameter string. For example, each item of integral delegation data may be set forth as a query string parameter. Further details regarding the contents, format, configuration, and other characteristics of the authorization data package are set forth below.

As shown in FIG. 1, the authorization message, including the authorization data package and its integral delegation data, is then passed from the protected resource 104 to the client application server 110. The authorization data package may thereafter be redeemed via a message sent from the client application server 110 to the authorization server 102.

When the client application attempts to redeem the authorization data package, the package contains information sufficient to identify, for example, the user, the client application, the protected resource 104, the rights of the client application when accessing the protected resource 104, etc. The package also contains information sufficient to allow the authorization server 102 to issue an access token for the delegation relationship. When the client application attempts to redeem the package at the authorization server 102, the authorization server 102 may analyze the contents (e.g., fields) from the package to uniquely match or otherwise identify a corresponding entry in the delegation table 114, and issue a delegation access token on that basis.

With the integral delegation data in the authorization data package, concurrent requests for authorization codes or refresh tokens may be handled without reading or writing records in the delegation database 112. In the example shown in FIG. 1, the two instances of the client application server 110 may concurrently request authorization. An authorization data package is returned to instance B of the client application server 110 without overwriting, deleting, or otherwise modifying any records in the delegation database 112 associated with the authorization of instance A of the client application server 110. In one example, a mobile client may thus obtain an authorization code at the same time as a desktop browser client. The reading and writing of records in the delegation database 112 is avoided even if the protected resource 104 sends another message (not shown) to the authorization server 102 to create a delegation entry. Such messaging between the protected resource 104 and the authorization server 102 for authorization of instance B of the client application server 110 is not shown for ease in illustration.

The integral delegation data in the authorization data package may alternatively or additionally address synchronization challenges within the system 100. The authorization data package may be presented for redemption as an authorization code or refresh token before the synchronization server 122 has been able to complete the synchronization. As shown in FIG. 1, instance B of the authorization server 102 may redeem the authorization data package with the instance of the authorization server 102 in time zone 2, regardless of whether the local delegation database 112 of that instance is yet updated with the current delegation registration records. In other examples, the authorization data package may be simultaneously redeemed at geographically distributed instances of the authorization server 102 immediately upon creation. The client application need not wait out a synchronization delay before redeeming or acting upon a newly created delegation authorization.

In some embodiments, a registration or other entry or record in the delegation database 112 is created for the first instance of the client application server 110 to request the protected resource data. Subsequent requests from other instances are then not recorded. Such subsequent requests may be handled without creating a large number of entries or records in the delegation database 112. Scale issues that may otherwise arise from, e.g., an end user having multiple devices to access the protected resource data, may be avoided. Alternatively, multiple entries may be recorded if, for instance, space is not a concern. Any unnecessary data may be collected or removed at a later point. While delegation entries need not be recorded in the delegation database 112 (because the data is provided via the authorization data package), in some embodiments, recording of delegation entries in the delegation database 112 may be useful in connection with supporting various monitoring or management functions. For example, the delegation entry data may support monitoring the users or client applications that have been provided access. Writing the delegation data to the delegation database 112 allows the system 100 to read the delegation database 112 later to identify the delegations for these and other purposes.

Although the integral delegation data provides a self-contained delegation registration, the delegation data may nonetheless be stored as an entry or record in the delegation database 112 and/or other data store(s) in communication with the processor 120. The delegation entry or record may then be synchronized across the local and master databases or stores of the other instances of the authorization server 102. The authorization may be registered via such storage despite the delivery of the delegation data in the authorization data package, and despite that the processor 120 may be configured to send the access token based on the analysis of the authorization data package rather than whether the record is available to the processor 120 or present in the database 112.

The authorization data package may be configured as an authorization code or as a refresh token. The type of delegation entry—authorization code or refresh token—may be indicated by the integral delegation data. The authorization data package may include a respective field, flag, or other element directed to specifying the type of delegation entry. Alternatively or additionally, the authorization data package is configured with fields directed to establishing the terms of the delegation entry, and, in so doing, imply the type of delegation entry. For example, the authorization data package may include fields directed to specifying authorization code start and end dates, as well as one or more fields directed to specifying a duration of the refresh token (e.g., start and end dates for the period in which the refresh token is valid). The presence or absence of data in such fields may be used to establish the type of delegation entry.

One or more of the above-identified fields in the authorization data package may be used to address the synchronization delay challenge. The authorization servers 102 may be configured to accept an attempt to redeem an authorization data package as an authorization code (even though the delegation database 112 has yet to include a corresponding delegation entry due to a synchronization delay), if the authorization code start date indicates a time within a tolerance window of, e.g., five or 10 minutes. The authorization code may be deemed valid if redemption occurs within the tolerance window. Other integral delegation data in the authorization data package may be used as timestamp data for this purpose or other purposes. The timestamp and other date/time data may be set forth in coordinated universal time (UTC).

In addition to timestamp and other duration-related data, the contents of the integral delegation data may specify a number of other items for the authorization registration. For example, in some cases, the scope of the authorization may be specified. The scope information may indicate the rights that the client application has when accessing the protected resource 104 on the user's behalf. The scope may be established in other or additional ways, including, for instance, as a policy of the protected resource 102 or in accordance with a default scope for an organization or enterprise with which the user is associated. The integral delegation data may specify an identity provider for the user for these and/or other purposes. As described below, the identity provider information may be used to validate the account status of the user before issuing an access token. Still other fields within the integral delegation data may specify a redirect uniform resource identifier (URI) for the client application, version information for the authorization data package, and/or other delegation information items.

The integral delegation data may be set forth in the authorization data package in a series of name-value pairs. In some embodiments, the series is set forth in a parameter string, which may be arranged in a Javascript Object Notation (JSON) format. Other formats may be used. The parameter string or other form of the integral delegation data may be signed by the authorization server 102. The signing of the authorization data package may be used by the authorization server 102 for authentication of the blob or other authorization data package at redemption. A hash-based message authentication code (HMAC), such as SHA256, may be used for signing. Other functions or formats may be used. The integral delegation data may be wrapped in a variety of containers, and need not be arranged as a blob within the authorization messages.

The integral delegation data may be compressed to limit or reduce the size of the authorization data package. Any compression technique may be used. In some embodiments, a Deflate algorithm or other lossless data compression algorithm or technique is applied to the integral delegation data.

The contents of the authorization data package are not made available to the protected resource 104 or the client application server 110. The integral delegation data may be cryptographically protected by the authorization server 102 or otherwise made opaque to entities outside of the authorization server 102 before transmission to the protected resource 104. The authorization data package may be encrypted in a variety of ways. For example, the Advanced Encryption Standard (AES) 256 may be used for encryption. The encryption may occur before or after the compression and/or signing. In some embodiments, the integral delegation data is encrypted after the integral delegation data is serialized into a parameter string and/or otherwise compressed.

The incorporation of an authorization data package in the authorization messaging may be used to address other problems that often arise in delegation scenarios involving large enterprises or organizations. For a business or other large organization or enterprise, consent for access by a client application may be established for thousands of users, which may give rise to a number of scale issues for the delegation database 112 and/or other components of the system 100. Such scale issues may be addressed by configuring the authorization data package to include further integral delegation data indicative of a consent type of the authorization. The consent type may identify whether an administrator set up the authorization on behalf of a plurality of end users of the enterprise, or whether the registration is specific to a particular end user. The integral delegation data may include a field or other item in the authorization data package to expressly indicate the consent type (e.g., Administrator or User), or the consent type may be implied or indirectly indicated by another field. For example, the information specifying the identity provider may be used to establish the consent type.

The consent type data allows the authorization server 102 to establish enterprise-wide consent via a delegation registration request sent by the administrator of the organization on behalf of the end users. In some embodiments, the delegation may be recorded in connection with the registration of a new client application with the system 100. Alternatively, an Administrator delegation may be registered at runtime (e.g., upon first use) of the client application. For example, a registration requestor (or recipient of a request) may have knowledge that the application is administrator-consented and, accordingly registers a single delegation entry for all applicable end users. The delegation registration request may be received and processed by the authorization server 102 to create a single Administrator delegation entry or record in the delegation database 112 for the entire organization. As shown in the example of FIG. 1, the table 114 is configured such that each record specifies a consent type, a user ID, a client application, and a protected resource (PR). Each record may include additional fields, such as a timestamp field. The entry may then be used to support future authorizations for an enterprise-wide number of users.

Once the administrator registration is stored in the delegation database 112, there is no need to register separate per-user delegation entries to record individual user consent. The authorization server 102 may recognize that an authorization request is emanating from an end user of an enterprise for which administrator consent has been previously provided. For example, the authorization server 102 may rely on the user ID of the end user to correlate the request with the previous consent. Records on a per user basis in the delegation database 112 need not be entered in such cases. Scale and security issues for the delegation database 112 and other system components may thus be avoided during runtime and other management of the authorization registrations.

While per user records are not entered, an authorization data package is nonetheless issued in response to an authorization request from an end user of the organization. If the authorization server 102 receives a request for an authorization code or a refresh token for a particular end user to utilize an administrator-consented client application, and an administrator-consented delegation entry exists in the delegation database 112, then the authorization server 102 issues an authorization blob or other authorization data package based on the delegation entry. The package may include integral delegation data identifying the end user (e.g., a user ID), such that, upon redemption of the package, the access token is customized for the end user (e.g., contains the per-user information in whose context the client application can access the protected resource 104). When the authorization data package is redeemed to obtain an access token, the consent type information in the authorization data package may be analyzed by the authorization server 102, along with the user ID of the end user, to issue an access token for the protected resource data specific or appropriate to that end user. User-specific access is provided without having to store and manage thousands of entries in the delegation database 112 for each individual end user in the organization.

The integrated delegation data in the authorization data package may also be useful in connection with other challenges presented by authorization registrations in enterprise user scenarios. In short, an individual user may leave the organization, after which redemption of the user's delegation may become a security issue for the enterprise. Refresh tokens may be valid for a fairly long time period (e.g., ranging from hours to years). Once the client application obtains a refresh token for a given user, the client application may redeem this refresh token repeatedly to request access tokens for the user's data at the protected resource 104. During this time period, the user may have left the enterprise or organization, or the user's account may have been disabled for other reasons. To mitigate this security issue, the authorization server 102 may be configured to verify that the user's account remains valid or active before allowing redemption of an authorization code/refresh token.

The user account status may be verified at the point of delegation registration and/or redemption. Either way, user account status is verified before issuing a delegation access token to the client application. For per-user delegations, user information for the status check may be obtained from the delegation entry in the delegation database 112. For administrator consented delegations, the user information may be obtained from the blob or other authorization data package at runtime.

The account verification may be implemented via a variety of techniques. For example, for MICROSOFT ACTIVE DIRECTORY® service or other cloud directory user accounts, the application program interface (API) of the directory, such as LogonUser, may be used to verify the user account. In other examples, the authorization server 102 may verify the account status via communications with the directory service 122 and/or the user directory database 126.

Figure 2:
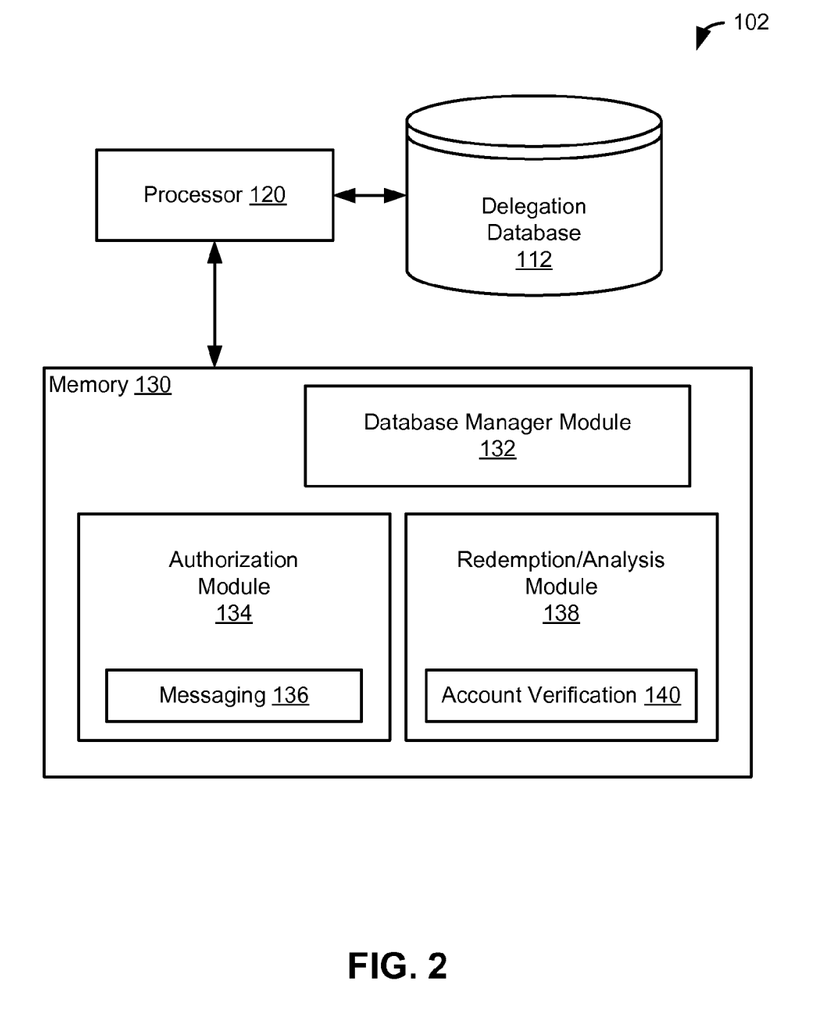
FIG. 2 is a block diagram of an authorization server of the system of FIG. 1.

FIG. 2 depicts the authorization server 102 in greater detail and in accordance with one embodiment. The authorization server 102 may include a memory 130 or other storage device in which a number of instruction sets are stored for execution by the processor 120. The instruction sets may be arranged in modules for implementation at various stages of operation. In this example, a database manager module 132 may configure the processor 120 to implement one or more database management functions in connection with the delegation database 112. Such functions may include, for instance, adding, deleting, or modifying a delegation entry or record in the delegation database 112, and/or querying or otherwise accessing the delegation database 112 to obtain delegation data.

The authorization server 102 may include an authorization module 134 stored in the memory 130 to configure the processor 120 to implement one or more delegation registration functions. For example, the authorization module 134 may be directed to initiating the creation of a delegation entry in response to a delegation message from the protected resource 104 (FIG. 1). Alternatively or additionally, the authorization module 134 may configure the processor 120 to generate and issue the authorization code/refresh token blob or other authorization data package described herein. The issuance of the authorization data package may be in response to the delegation message, with the authorization data package including the constituent, built-in, or otherwise integral delegation data as described above.

In the embodiment of FIG. 2, the authorization module 134 includes a messaging module 136 to support messaging and other communications with the protected resource 104 and the client application server 110. The messaging module 136 may configure the processor 120 for receiving and transmitting the various authorization messages described herein, including the issuance of the authorization message to the protected resource 104 with the authorization data package and integral delegation data therein.

The authorization server may also include a redemption analysis module 138 stored in the memory 130 to configure the processor 130 to implement an analysis of the authorization data package upon redemption. The analysis may be conducted in response to a redemption message from the client application server 110 (FIG. 1). The redemption message includes the authorization data package, as described above. The analysis may include an evaluation of the integral delegation data to determine whether an access token is to be issued. Further details regarding an exemplary analysis are provided below. The analysis may include multiple evaluations of the integral delegation data. For example, the analysis may include a verification of an account status of the user, as described herein.

The redemption analysis module may also configure the processor 130 to send (e.g., cause the messaging module 136 to send) an access token based on the analysis. In some cases, e.g., during a synchronization delay, the redemption analysis module 138 may configure the processor 130 to send the access token based on the analysis rather than whether a corresponding delegation entry or record is located by, or otherwise available to, the processor 130.

In one embodiment, the authorization server 102 may be configured by the above-described modules (or other instructions or instruction sets) to support concurrent authorization operation and/or address other scenarios arising from multiple clients, multiple authorization servers, or an otherwise distributed architecture. In this example, when the authorization server 102 receives a request to register a delegation entry, the authorization server 102 may determine whether a delegation already exists for the information identified by the request. Such information may correspond with some of the delegation data described above. For example, the request may provide information indicative of a consent type (e.g., administrator or end user), a user ID, a client ID, and a protected resource ID. Such information may be arranged in a {ConsentType, User, ClientApp, Resource} tuple specified by or otherwise included in the request. If a delegation does not exist, the authorization server 102 creates a new delegation entry, e.g., in the delegation database 112 (FIG. 1), and issues a short-lived authorization code to the server requesting the delegation. The authorization code is modeled or configured as a blob or other authorization data package as described above. If a delegation does exist, the authorization server 102 issues a new short-lived authorization code based on the existing delegation entry.

On redemption, if a delegation entry exists for the {ConsentType, User, ClientApp, Resource} tuple identified by the blob or other authorization data package, the authorization server 102 honors the authorization code package and issues an access token and a refresh token to the client. The authorization server 102 need not store authorization codes or refresh tokens in the delegation database 112 (FIG. 1). Thus, the authorization process allows for multiple authorizations (or authorization codes) to be active or issued concurrently, each of which may be valid for a very short lifetime. If a delegation entry does not exist for the tuple, the authorization server 102 may nonetheless issue an access token to the client based on the integral delegation data supplied in the authorization data package as described herein.

The issuance of refresh tokens may be similar. The refresh token may also be modeled as a blob or other authorization data package, similar to the authorization code. The refresh token blob or other package may include integral delegation data specifying a start date, an end date and a tuple used to uniquely identify a corresponding delegation entry. For example, the integral delegation data in the tuple may specify information, such as a consent type, a user ID, a user name identifier, a user identity provider, a client application, a protected resource, and a scope of access rights.

If a delegation registration has been revoked, an entry or record is no longer present in the database. The authorization server 102 accordingly declines to issue any further access tokens to clients based on the authorization code or refresh token. For these and other reasons, the authorization codes and refresh tokens need not be stored in the database.

Additional, fewer, or alternative instruction sets or modules may be stored in the memory 130. For example, the instructions of the authorization module 134 and the redemption analysis module 138 may be integrated to any desired extent.

In some embodiments, the authorization server 102 shown in FIGS. 1 and 2 may be distributed over multiple server or other computing systems or devices. For example, the processor 120 may include multiple processors, servers, or other computers in networked communication with one another, and configured to execute the above-described instruction sets in either collective or respective fashion. In one exemplary embodiment, the authorization module 134 may be executed by one of the processors or other computers, while the redemption analysis module 138 may be executed by a different one of the processors or other computers. Such distributed processing may arise, for example, in architectures having geographically or otherwise distributed authorization services. The authorization server 102 issuing the authorization data package need not be the same authorization server 102 that handles the redemption of the authorization data package. The processor 120 may include such multiple instances of the authorization server 102.

Figure 3:
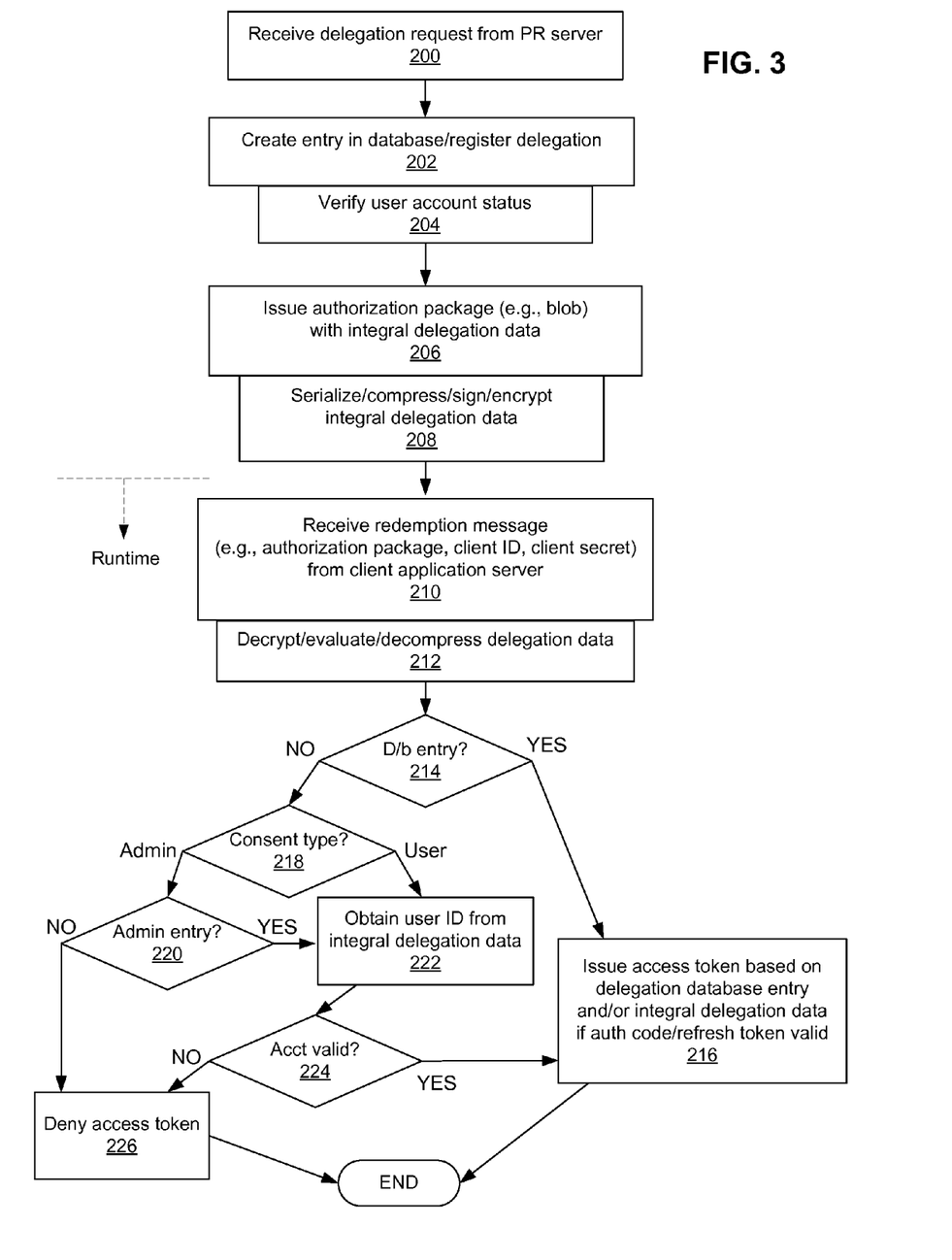
FIG. 3 is a flow diagram of an exemplary computer-implemented method for authorization messaging in accordance with one embodiment.

FIG. 3 depicts an exemplary method of authorizing access by a client application to a resource of a user maintained on a server computing system, such as the protected resource 104 (FIG. 1). The client application is implemented on a different server computing system, such as the client application server 110 (FIG. 1). The access may be authorized by an access control or authorization service, such as the authorization server 102 (FIG. 1). The method is computer-implemented. For example, one or more instances of the authorization server 102 may be configured to implement one or more of the acts of the method. The implementation of each act may be directed by respective computer-readable instructions executed by one or more processors of the authorization server 102 and/or another processor or processing system.

In some cases, the method may begin with any number of acts directed to initializing or setting up a delegation database. For example, one or more database entries or records may be created or stored in accordance with an administrator-based consent to authorize access one or more protected resources.

In the embodiment of FIG. 3, the method begins with an act 200 in which an access request or other delegation message is received from a protected resource (PR) application or server. The access request may be configured to trigger or initiate the delegation of access control for authorizing access by a particular client application or client application server. As described above, a delegation entry in a delegation database may be created in an act 202 in response to the request. The creation of the entry registers the authorization delegation for a particular user and client in connection with the respective protected resource from which the delegation request is received. In some cases, the act 202 includes a verification of user account status in an act 204. The verification may be implemented in both administrator-consented delegations as well as per user delegations.

In act 206, an authorization message is issued in response to the delegation message. The authorization message is sent to the protected resource application or server for redemption by the client application or server. As described above, the authorization message includes a blob or other authorization data package, which, in turn, includes integral delegation data. Such delegation data may be indicative of the user, the protected resource, the client application, a timestamp, a consent type, and/or other data. The integral delegation data may be serially arranged, compressed, encrypted, and/or signed in an act 208 as part of the issuance process. For example, the delegation data may be serialized or otherwise arranged in a parameter string. The parameter string may then be compressed, encrypted, and signed.

The remainder of the method may be implemented during a runtime period, which may occur shortly after the issuance of the authorization message (e.g., within an authorization code window) or during an extended time period (e.g., during the term of a refresh token). In act 210, a redemption message is received from the client application or server. As described above, the redemption message includes the authorization data package containing integral delegation data rather than merely a unique handle. The redemption message may also include additional information or data, such as a client ID and client secret, that is not contained within the authorization data package.

The reception of the redemption message may include the decryption and decompression of the authorization data package in an act 212. Once decrypted and/or decompressed, the authorization data package may be evaluated to confirm the authenticity thereof. For example, the authenticity may be confirmed by the presence of a signature of an authorization server.

An analysis of the contents of the authorization data package may then be conducted. In the embodiment of FIG. 3, the integral delegation data in the authorization data package may be evaluated or otherwise analyzed in a series or set of decision blocks. One or more of the evaluations may involve data other than the integral delegation data obtained from the authorization data package. For example, the integral delegation data may be compared with, or otherwise evaluated in light of, data from the delegation database and/or other databases, such as user directory database.

The integral delegation data may be analyzed to determine in a decision block 214 whether a corresponding delegation entry is present in the delegation database for a user ID specified in the integral delegation data. If yes, then control passes to a block 216 in which an access token is issued based on the entry in the delegation database and/or the integral delegation data (provided that the authorization code or refresh token provided via the authorization data package has not expired or remains otherwise valid). If not, control passes in this example to a decision block 218 in which the analysis of the integral delegation data determines the consent type of the delegation entry specified in the integral delegation data. If an administrator-based consent is found, then control passes to a decision block 220 to determine whether a corresponding administrator delegation entry is present in the delegation database. If yes, then the user ID is obtained in an act 222 from the integral delegation data. A decision block 224 may then verify an account status of the user. If the account remains valid, then the access token may be issued or otherwise sent in accordance with the act 216. If the account is no longer valid, then an access token is denied in an act 226. The act 226 is also implemented in the event that an administrator delegation entry is not found during the analysis of the decision block 220.

The order of the acts of the method may vary in addition to those variations identified above. For example, the integral delegation data may be evaluated for the type of consent before other steps in the analysis. In another example, the user account status may be verified before other steps in the analysis.

Figure 4:
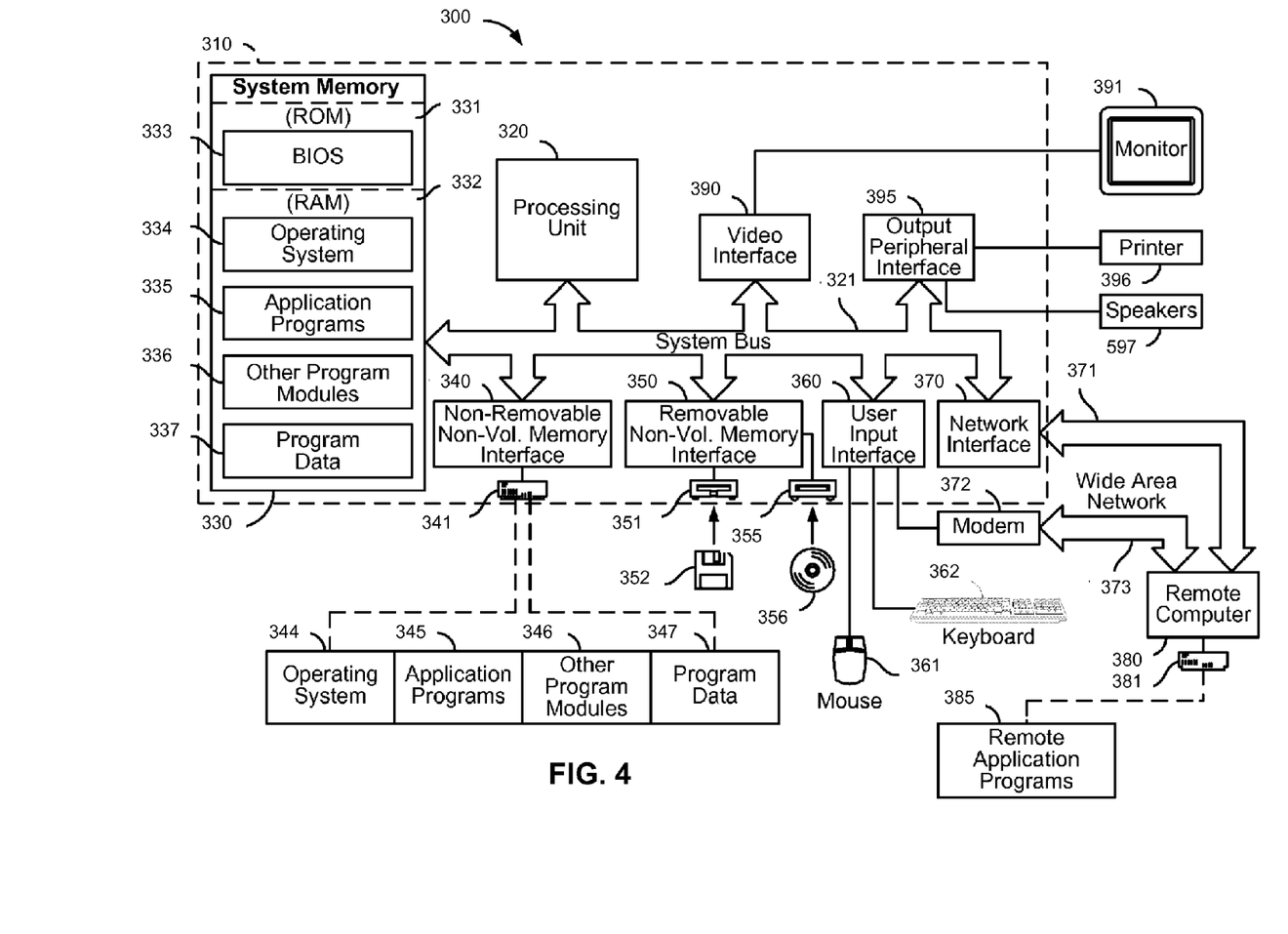
FIG. 4 is a block diagram of a computing environment in accordance with one embodiment for implementation of one or more of the disclosed methods and systems.

With reference to FIG. 4, an exemplary computing environment 300 may be used to implement one or more aspects or elements of the above-described methods and/or systems. The computing environment 300 of FIG. 4 may be used by, or incorporated into, one or more elements of the system 100 (FIG. 1). For example, the computing environment 300 may be used to implement the authorization server 102 (FIG. 1), and/or one or more of the other servers described above. The computing environment 300 may be used or included as a client, network server, application server, or database management system or other data store manager, of any of the aforementioned elements or system components. The computing environment 300 may be used to implement one or more of the acts described in connection with FIG. 4.

The computing environment 300 includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The units, components, and other hardware of computer 310 may vary from the example shown.

Computer 310 typically includes a variety of computer readable storage media configured to store instructions and other data. Such computer readable storage media may be any available media that may be accessed by computer 310 and includes both volatile and nonvolatile media, removable and non-removable media. Such computer readable storage media may include computer storage media as distinguished from communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 310.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 4 illustrates operating system 334, application programs 335, other program modules 336, and program data 337. For example, one or more of the application programs 335 may be directed to implementing the authorization module 134, the redemption analysis module 138, and/or one or more of the other instruction sets described above. In this or another example, any one or more the instruction sets in the above-described memories or data storage devices may be stored as program data 337.

Any one or more of the operating system 334, the application programs 335, the other program modules 336, and the program data 337 may be stored on, and implemented via, a system on a chip (SOC). Any of the above-described modules may be implemented via one or more SOC devices. The extent to which the above-described modules are integrated in a SOC or other device may vary.

The computer 310 may also include other removable/non-removable, volatile/nonvolatile computer storage media. By way of example only, FIG. 4 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 4, provide storage of computer readable instructions, data structures, program modules and other data for the computer 310. For example, hard disk drive 341 is illustrated as storing operating system 344, application programs 345, other program modules 346, and program data 347. These components may either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and pointing device 361, commonly referred to as a mouse, trackball or touch pad. Other input devices (not shown) may include a microphone (e.g., for voice control), touchscreen (e.g., for touch-based gestures and other movements), ranger sensor or other camera (e.g., for gestures and other movements), joystick, game pad, satellite dish, and scanner. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 4. The logical connections include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. FIG. 4 illustrates remote application programs 385 as residing on memory device 381. The network connections shown are exemplary and other means of establishing a communications link between the computers may be used.

The computing environment 300 of FIG. 4 is only one example of a suitable computing environment and is not intended to suggest any limitation as to the scope of use or functionality of the technology herein. Neither should the computing environment 300 be interpreted as having any dependency or requirement relating to any one or combination of components illustrated in the exemplary operating environment 300.

The technology described herein is operational with numerous other general purpose or special purpose computing system environments or configurations. Examples of well-known computing systems, environments, and/or configurations that may be suitable for use with the technology herein include, but are not limited to, personal computers, server computers (including server-client architectures), hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A computer-implemented method for authorizing access by a client application to a resource of a user maintained on a first server computing system, the client application being implemented on a second server computing system, the method comprising:
   receiving a delegation message from the first server computer system to initiate authorization of the access by the client application;
   issuing, in response to the delegation message, an authorization message to the first server computer system, the authorization message comprising an authorization data package for redemption by the client application, the authorization data package comprising first through fourth integral delegation data specifying the user, the client application, the resource, and a timestamp, respectively;
   receiving a redemption message from the second server computing system comprising the authorization data package;
   conducting, with a processor, an analysis of the authorization data package; and
   sending an access token to the second server computing system based on the analysis.

2. The computer-implemented method of claim 1, wherein the authorization is registered via an entry in a database, and wherein the access token is sent based on the analysis rather than whether the database entry is available to the processor.

3. The computer-implemented method of claim 1, wherein a record of a previous authorization for the client application is present in a data store in communication with the processor when the delegation message is received, and wherein the access token is sent based on the analysis rather than the record in the data store.

4. The computer-implemented method of claim 1, wherein the authorization data package further comprises further integral delegation data indicative of a consent type of the authorization, the consent type identifying whether an administrator set up the authorization on behalf of a plurality of enterprise users, the plurality of enterprise users comprising the user.

5. The computer-implemented method of claim 1, wherein conducting the analysis comprises determining whether a delegation entry in a delegation database exists for the user based on the first integral delegation data.

6. The computer-implemented method of claim 1, wherein conducting the analysis comprises verifying an account status for the user based on the first integral delegation data.

7. The computer-implemented method of claim 1, wherein the authorization data package is encrypted.

8. The computer-implemented method of claim 1, wherein the authorization data package is configured as a binary large object (blob) within the authorization message.

9. The computer-implemented method of claim 1, wherein issuing the authorization message comprises serializing the first through fourth integral delegation data in a parameter string.

10. The computer-implemented method of claim 9, wherein issuing the authorization message further comprises compressing, encrypting, and signing the parameter string.

11. The computer-implemented method of claim 9, wherein the parameter string has a Javascript Object Notation (JSON) format.

12. The computer-implemented method of claim 1, wherein the authorization data package is configured as a refresh token and further comprises further integral delegation data indicative of a duration of the refresh token.

13. The computer-implemented method of claim 1, wherein the authorization data package further comprises further integral delegation data indicative of a scope of rights granted to the client application.

14. A system for authorizing access by a client application to a resource of a user maintained on a first server computing system, the client application being implemented on a second server computing system, the system comprising:
   a memory in which authorization instructions and redemption analysis instructions are stored; and
   a processor coupled to the memory and configured to execute the authorization instructions to issue, in response to a delegation message from the first server computing system to initiate authorization of the access, an authorization message comprising an authorization data package, the authorization data package comprising first through fourth integral delegation data specifying the user, the client application, the resource, and a timestamp, respectively;
   wherein the processor is further configured to execute the redemption analysis instructions to:
      conduct an analysis of the authorization data package in response to a redemption message from the second server computing system comprising the authorization data package, the analysis comprising an evaluation of the first integral delegation data to verify an account status of the user; and
      send an access token to the second server computing system based on the analysis.

15. The system of claim 14, further comprising a data store in communication with the processor and configured to register the authorization via storage of a record in the data store, and wherein the processor is configured to execute the redemption analysis instructions to send the access token based on the analysis rather than whether the record is available to the processor.

16. The system of claim 14, further comprising a data store in communication with the processor and configured to store a record of a previous authorization for the client application, wherein the processor is configured to execute the redemption analysis instructions to send the access token based on the analysis rather than the record in the data store.

17. The system of claim 14, further comprising a data store in communication with the processor and configured to store a record of a previous authorization for the client application based on administrator consent to future authorizations for a plurality of enterprise users, the plurality of enterprise users comprising the user, wherein the processor is configured to execute the redemption analysis instructions to send the access token based on the analysis and the record of the previous authorization.

18. The system of claim 17, wherein the authorization data package further comprises further integral delegation data indicative of a consent type of the authorization, the consent type identifying whether the administrator set up the authorization on behalf of the plurality of enterprise users.

19. The system of claim 14, wherein the processor comprises first and second server computers in networked communication with one another and configured to execute the authorization and redemption analysis instructions, respectively.

20. A computer program product for implementing a method of authorizing access by a client application to a resource of a user maintained on a first server computing system, the client application being implemented on a second server computing system, the computer program product comprising one or more computer-readable storage media having stored thereon computer-executable instructions that, when executed by one or more processors of a computing system, cause the computing system to perform the method, the method comprising:

receiving a delegation message from the first server computer system to initiate authorization of the access by the client application;

issuing, in response to the delegation message, an authorization message to the first server computer system for redemption by the second server computer system, the authorization message comprising an authorization data package, the authorization data package comprising integral delegation data specifying the user, the client application, the resource, a timestamp, and a consent type, the integral delegation data being serially arranged, compressed, encrypted, and signed in a parameter string, the consent type being indicative of whether an administrator authorized the access on behalf of the user;

receiving a redemption message from the second server computing system comprising the authorization data package;

conducting an analysis of the authorization data package, the analysis comprising an evaluation of the integral delegation data to verify an account status of the user; and sending an access token to the second server computing system based on the analysis.

* * * * *